United States Patent
Prevoir et al.

(10) Patent No.: US 12,269,934 B2
(45) Date of Patent: Apr. 8, 2025

(54) OMNIPHOBIC COMPOSITIONS

(71) Applicant: Bose Corporation, Framingham, MA (US)

(72) Inventors: Shawn J. Prevoir, Northborough, MA (US); Amrita Kumar, Acton, MA (US)

(73) Assignee: Bose Corporation, Framingham, MA (US)

( * ) Notice: Subject to any disclaimer, the term of this patent is extended or adjusted under 35 U.S.C. 154(b) by 344 days.

(21) Appl. No.: 17/829,884

(22) Filed: Jun. 1, 2022

(65) Prior Publication Data

US 2022/0389194 A1 Dec. 8, 2022

Related U.S. Application Data

(60) Provisional application No. 63/195,488, filed on Jun. 1, 2021.

(51) Int. Cl.
*C08K 9/06* (2006.01)
*C08G 77/04* (2006.01)
*C08K 3/34* (2006.01)
*C09D 7/62* (2018.01)

(52) U.S. Cl.
CPC .............. *C08K 9/06* (2013.01); *C08G 77/04* (2013.01); *C08K 3/346* (2013.01); *C09D 7/62* (2018.01); *C08K 2201/003* (2013.01); *C08K 2201/004* (2013.01); *C08K 2201/011* (2013.01); *C08K 2201/019* (2013.01)

(58) Field of Classification Search
None
See application file for complete search history.

(56) References Cited

U.S. PATENT DOCUMENTS

| | | |
|---|---|---|
| 8,792,665 B2 | 7/2014 | Lin |
| 9,421,574 B2 | 8/2016 | Hanson |
| 9,505,029 B2 | 11/2016 | Hanson |
| 10,059,595 B1 * | 8/2018 | Farbstein ............... B29C 43/56 |
| 10,623,861 B2 | 4/2020 | Prevoir et al. |
| 2008/0310660 A1 | 12/2008 | Lin |
| 2019/0144686 A1 | 5/2019 | Hanson et al. |
| 2021/0163294 A1 * | 6/2021 | Zhang .................... C08K 3/041 |

OTHER PUBLICATIONS

Ahmad et al., "Prospective study of the microbiological flora of hearing aid moulds and the efficacy of current cleaning techniques," The Journal of Laryngology & Otology, Sep. 29, 2006, 121(2):110-113 (abstract only).

Chen et al., "Water and Ethanol Droplet Wetting Transition during Evaporation on Omniphobic Surfaces," Sci Rep. Nov. 25, 2015, 5(17110), 11 pages.

Karaca et al., "External auditory canal microbiology and hearing aid use," American Journal of Otolaryngology, Jan. 11, 2013, 34(4): 278-281 (abstract only).

(Continued)

*Primary Examiner* — Roberts P Culbert
(74) *Attorney, Agent, or Firm* — Fish & Richardson P.C.

(57) ABSTRACT

This disclosure generally relates to compositions with omniphobic properties, and methods of preparing the compositions thereof. The omniphobic compositions can be used as coatings to make omniphobic materials, which can be used to manufacture a variety of apparatuses such as wearable devices, e.g., hearing aids.

17 Claims, 1 Drawing Sheet

(56) References Cited

OTHER PUBLICATIONS

Lin "Improve Reliability of Hearing Instruments using Nano Technology" 2015 International Conference on Manipulation, Manufacturing and Measurement on the Nanoscale (3M-NANO), Oct. 5-9, 2015, 4 pages.
Liu et al., "Turning a surface super repellent even to completely wetting liquids," Science, Nov. 28, 2014, 346(6213):1096-1100 (abstract only).
Marshall "Hearing Aid Quality: Improving Moisture and Wax Protection," Starkey Hearing Technologies, 2012, 5 pages.
Parvate et al., "Superhydrophobic Surfaces: Insights from Theory and Experiment," J. Phys. Chem. B, Jan. 13, 2020, 124:1323-1360.
Tuteja et al., "Robust omniphobic surfaces," PNAS, Nov. 25, 2008, 105(47), 18200-18205.

\* cited by examiner

OMNIPHOBIC COMPOSITIONS

CLAIM OF PRIORITY

This application claims priority to U.S. Patent Application Ser. No. 63/195,488, filed on Jun. 1, 2021, the entire contents of which are hereby incorporated by reference.

TECHNICAL FIELD

This disclosure generally relates to compositions with omniphobic properties, and methods of preparing the compositions thereof. The omniphobic compositions can be used as coatings to make omniphobic materials, which can be used to manufacture a variety of apparatuses such as wearable devices, e.g., hearing aids.

BACKGROUND

An omniphobic material refers to a material characterized in that it repels both water and organic, non-polar and polar liquids such as oil, fatty acids, and hydrocarbons. Such materials can resist wetting, and can be used to prepare a variety of apparatuses with a stretchable and flexible material that can resist wetting.

SUMMARY

In one aspect, described herein are examples of a composition that can include a plurality of fluorinated nanotubes and a binder. The plurality of fluorinated nanotubes can include one or more fluorinated additives, and is present in the composition from about 5% to about 90% by weight, and the binder is present in the composition from about 5% to about 95% by weight.

In one aspect, the plurality of fluorinated nanotubes is present in the composition from about 35% to about 45% by weight, and the binder is present in the composition from about 55% to about 65% by weight In one aspect, described herein are examples of a composition that can include a plurality of fluorinated nanotubes, an optional fluorochemical, and a binder. The plurality of fluorinated nanotubes is present in the composition from about 30% to about 55% by weight, the fluorochemical is present in the composition from about 15% to about 40% by weight, and the binder is present in the composition from about 30% to about 55% by weight.

In an aspect, the optional fluorochemical is present in the composition from about 0% to about 40% by weight.

In an aspect, the one or more fluorinated additives include a perfluorosilane.

In an aspect, the one or more fluorinated additives include a non-silicon containing fluorinated agent, which can be cationic, neutral, monomeric or polymeric.

In an aspect, the plurality of fluorinated nanotubes are made of aluminum, carbon, magnesium, silica, silver, oxides, or mixtures and derivatives thereof. Examples of fluorinated nanotubes included fluorinated palygorskite, halloysites, cellulose nanocrystals (CNC), silica nanoparticles, carbon nanotubes, or silver nanorods, or mixtures thereof.

In an aspect, the plurality of fluorinated nanotubes are about 0.1 µm to about 10 µm in length and from about 10 nm to about 500 nm in diameter. In an aspect, the plurality of fluorinated nanotubes are about 0.3 µm to about 5 µm in length and from about 10 nm to about 80 nm in diameter. In an aspect, the plurality of fluorinated nanotubes are about 0.2 to about 5 µm in length and from about 30 nm to about 70 nm in diameter.

In an aspect, the fluorinated nanotubes have an average weight ratio of nanotubes to the fluorinated additives of about 95:5 to about 60:40, or about 83:17 to about 66:34.

In an aspect, the binder of the compositions can include silicone binders, styrene-isobutylene block (SIBS) copolymers, polyurethane elastomers, epoxides, or acrylics, or mixtures thereof.

In an aspect, the binder of the compositions can include a silicone binder.

In an aspect, the optional fluorochemical of the compositions can include a perfluorosilane.

In an aspect, the optional fluorochemical of the compositions can include a non-silicon containing fluorinated agent, which can be cationic, neutral, monomeric or polymeric.

In an aspect, the compositions can include about 30% to about 55% of fluorinated nanotubes, about 15% to about 40% of a fluorochemical, and about 30% to about 55% of a binder by weight.

In an aspect, the compositions can include about 38% fluorinated nanotubes and about 62% of a binder by weight.

In an aspect, the compositions can include about 31% fluorinated nanotubes, about 18% of a fluorochemical, and about 51% of a binder by weight.

In an aspect, the compositions can include a plurality of fluorinated halloysite nanotubes which include a perfluorosilane additive, an optional fluorochemical, and a silicone binder. The fluorinated halloysite nanotubes can have an average diameter of about 30 nm to about 70 nm, and an average length of about 0.2 µm to about 5 µm.

In an aspect, the compositions can include a plurality of fluorinated cellulose nanocrystals which include a perfluorosilane additive, an optional fluorochemical, and a silicone binder. The fluorinated cellulose nanocrystals can have an average diameter of about 1 nm to about 50 nm, and an average length of about 100 nm to about 3000 nm.

In an aspect, the compositions containing a plurality of fluorinated cellulose nanocrystals at about 38% by weight and a silicone binder at about 62% by weight.

In an aspect, the compositions containing a plurality of fluorinated cellulose nanocrystals at about 31% by weight, a fluorochemical at about 18% by weight and a silicone binder at about 51% by weight.

In an aspect, the compositions containing a plurality of fluorinated nanotubes, an optional fluorochemical, and a binder is applied onto a material's surface as a coating material.

In an aspect, the compositions containing a plurality of fluorinated cellulose nanocrystals, an optional fluorochemical, and a binder is applied onto a material's surface as a coating material.

In an aspect, the substrate can be a silicone rubber, a polyurethane, a fluorocarbon-based fluoroelastomer (FKM rubber), a butyl rubber, an ethylene propylene diene monomer (EPDM) rubber, a thermoplastic, a cellulose, or a metal.

In an aspect, the material's surface is non-textured.

In an aspect, the material's surface is textured.

In an aspect, the contact angle of a water droplet placed on a material coated with the compositions described herein is at least about 110 degrees.

In an aspect, the contact angle of a water droplet placed on a material coated with the compositions described herein is between about 110 degrees and about 140 degrees.

In an aspect, the contact angle of a water droplet placed on a material coated with the compositions described herein is at least about 140 degrees.

In an aspect, the contact angle of an oil droplet placed on a material coated with the compositions described herein is at least about 90 degrees.

In an aspect, the contact angle of an oil droplet placed on a material coated with the compositions described herein is between about 90 degrees and about 140 degrees.

In an aspect, the contact angle of an oil droplet placed on a material coated with the compositions described herein is at least about 140 degrees.

In an aspect, a method of preparing the compositions that include fluorinated nanotubes and a binder is described. The method includes the following steps: (a) activating the surface of a plurality of nanotubes; (b) sonicating a mixture of activated nanotubes dispersed in a solvent; (c) heating the sonicated mixture with one or more fluorinated additives; and removing solvent from the heated mixture.

In an aspect, the activating of the surface of nanotubes is achieved by oxidation, which can be chemical oxidation, photo-oxidation, or gas-phase oxidation.

In an aspect, a method of preparing a material coated with the compositions that include fluorinated nanotubes, an optional fluorochemical, and a binder is described. The method includes the following steps: (a) preparing a first mixture comprising about 10% to about 30% by weight of a composition described herein, and one or more thinners; (b) sonicating the first mixture to provide a second mixture; (c) spraying the second mixture onto a substrate's surface using a hand sprayer to generate a sprayed substrate; and (d) curing the sprayed substrate. In one aspect, the wt % of the composition in the first mixture in step (a) is about 20%.

In an aspect, the sprayed substrate of step (d) is further sprayed with a fluorochemical which can be a perfluorosilane or a non-silicon containing fluorinated compound.

In an aspect, provided herein are apparatuses that can be made using the compositions of fluorinated nanotubes and a binder described herein. In an aspect, provided herein are apparatuses that can be made using materials coated with the compositions described herein. In an aspect, the apparatuses are made using materials coated with the compositions described herein, and further sprayed with a fluorochemical. Examples of such apparatuses include an acoustical device, a microphone, a wearable device, a hearing aid, a waveguide, a wax guard, an eartip, or an earpiece. In one aspect, the apparatus is a receiver in canal (RIC) hearing aid. In one aspect, the apparatus is a component of a RIC hearing aid. In one aspect, the apparatus is a wax guard of a RIC hearing aid.

Any two or more of the features described in this specification, including in this summary section, can be combined to form implementations not specifically described herein. The details of one or more implementations are set forth in the accompanying drawings and the description below. Other features and advantages will be apparent from the description and drawings, and from the claims.

DETAILED DESCRIPTION

The present disclosure describes compositions with omniphobic properties, characterized in that these compositions can resist wetting by both water and organic, polar and non-polar liquids. Such omniphobic compositions can be applied as a coating onto a variety of materials to generate omniphobic materials that can be used in a wide range of applications from liquid-repellent fabrics, wearable devices, electronic devices, to everyday items where the omniphobic material can prevent buildup of grime and improve the longevity of the item. For example, an omniphobic material can be used in the manufacturing of hearing aids, in particular, receiver in canal (RIC) hearing aids, where a common mode of failure for these devices is the clogging of audio ports due to buildup from perspiration, skin oils and earwax. Current solutions to solve the moisture and wax accumulation issues for RIC are not convenient, since the clogged ports or waveguide can require replacement or cleaning. An alternative solution is to prevent the buildup of bodily secretions and contaminants from the outset, thereby mitigating the need for frequent cleaning and/or replacing the parts.

While materials with surfaces that repel water (i.e., hydrophobic surfaces) are relatively easy to make and well-understood, materials that repel both water and organic, polar and non-polar liquids such as oil and hydrocarbon, which have lower surface tension than water, are much more challenging to produce. Due to the low surface tension of non-polar liquids, these liquids tend to spread on a surface, rather than forming droplets on surfaces. This property renders the creation of a surface that can resist wetting by both water, organic, polar, and non-polar liquids (i.e., an omniphobic surface) a challenge.

A superhydrophobic (or ultrahydrophobic) material is defined as a material with surfaces that are extremely difficult to wet by water, where the contact angle ($\theta$) of a water droplet placed on such surfaces exceeds 150°, and the sliding angle is less than 5° (Parvate, S. et al. *J.Phys. Chem. B*, 2020: 124(8) 1323-1360). A significant factor in determining the superhydrophobicity of a surface is its roughness. Known as the lotus effect, a material with a textured surface can help resist wetting by trapping pockets of air between its surface and a water droplet, which reduces the droplet's adhesion to the surface so that the droplet rolls off the surface, giving rise to the desirable self-cleaning properties of a superhydrophobic surface. Many natural surfaces, including those of plant leaves and bird feathers, possess re-entrant surface texture, rendering them superhydrophobic. Achieving such behavior with a textured surface is typically not sufficient for nonpolar liquids, since these liquids do not form droplets easily. One strategy to create an oleophobic material is to coat a substrate with a low surface energy coating material, e.g., fluorinated materials, including Teflon®, Aculon® NanoProof™ 5.1, AsahiGuard E-Series™, and polyhedral oligomeric silsesquioxanes (F-POSS) (US2019/0144686; U.S. Pat. Nos. 9,421,574; 9,505,029; Tuteja, A. et al. *Proc. Natl. Acad. Sci. USA*. 2008: 105). Materials that are both hydrophobic and oleophobic, i.e., omniphobic, are much rarer. One example of a commercially available omniphobic coating is HydraShield2® developed by Starkey Hearing Technologies, the composition of which is proprietary (U.S. Pat. No. 8,792,665; US 2008/0310660; Lin. W. "Improve Reliability of Hearing Instruments using Nano Technology" 2015 International Conference on Manipulation, Manufacturing and Measurement on the Nanoscale (3M-NANO) Conference Paper). Depending upon the physicochemical properties of the underlying substrate, not all fluorinated materials can be used to coat all the different types of substrate to yield a robust material with a long-lasting, omniphobic surface.

The term "omniphobic," as used herein, refers to the characteristics of being resistant to wetting by both water and non-polar liquids such as oil, fatty acids, and hydrocarbons. The omniphobic compositions of the present disclosure comprise a plurality of fluorinated nanotubes, an optional fluorochemical, and a binder, wherein the fluorinated nanotubes comprise one or more fluorinated additives. The amount of fluorinated nanotubes present in the compositions can be from about 5% to about 90%, from about 20% to about 40%, from about 40% to about 60%, from about 60% to about 80%, from about 10% to about 20%, from about 20% to about 30%, from about 30% to about 40%, from about 40% to about 50%, from about 50% to about 60%, from about 60% to about 70%, from about 70% to about 80%, or from about 80% to about 90% by weight of the composition. In some implementations, the amount of fluorinated nanotubes present in the compositions is about 34%. In some implementations, the amount of fluorinated nanotubes present in the compositions is about 31%. The amount of the optional fluorochemical present in the compositions can be from about 0% to about 90%, from about 20% to about 40%, from about 40% to about 60%, from about 60% to about 80%, from about 10% to about 20%, from about 20% to about 30%, from about 30% to about 40%, from about 40% to about 50%, from about 50% to about 60%, from about 60% to about 70%, from about 70% to about 80%, or from about 80% to about 90% by weight of the composition. In some implementations, the amount of the fluorochemical present in the compositions is about 18%. The amount of binder present in the compositions can be from about 95% to about 5%, from about 90% to about 70%, from about 70% to about 50%, from about 50% to about 30%, from about 90% to about 80%, from about 80% to about 70%, from about 70% to about 60%, from about 60% to about 50%, from about 50% to about 40%, from about 40% to about 30%, from about 30% to about 20%, or from about 20% to about 10% by weight of the composition. In some implementations, the amount of binder present in the compositions is about 51% by weight. In some implementations, the amount of binder present in the compositions is about 66% by weight. In some implementations, the weight ratio of binder to fluorinated nanotubes present in the compositions is about 1:1, about 3:2, about 2:1, about 5:1, about 3:1, about 4:1, about 5:3, or about 5:2. In some implementations, the weight ratio of binder to fluorinated nanotubes present in the compositions is about 2:1. In some implementations, the weight ratio of binder to fluorinated nanotubes present in the compositions is about 5:3. In some implementations, the weight ratios of the binder:fluorochemical:fluorinated nanotubes present in the compositions is about 90:0:10, about 55:35:10, about 30:0:70, about 30:35:35, about 73:17:10, about 30:18:52, about 60:0:40, about 43:35:25, or about 51:18:31. In some implementations, the weight ratio of binder:fluorochemical:fluorinated nanotubes present in the compositions is about 51:18:31. In some implementations, the weight ratio of binder:fluorochemical:fluorinated nanotubes present in the compositions is about 30:18:52.

The fluorinated nanotubes described herein can be produced by modifying a plurality of nanotubes with one or more fluorinated additives. Suitable fluorinated additives for modifying nanotubes include perfluorosilanes and non-silicon containing fluorinated agents. Non-silicon containing fluorinated agents can be a cationic fluorinated agent, a neutral fluorinated agent, a monomeric, oligomeric, or polymeric fluorinated agent. In some implementations, the non-silicon containing fluorinated agent is a fluorinated methacrylate. In some implementations, the non-silicon containing fluorinated agent is a fluorinated polyurethane. In some implementations, the fluorinated agent is one of the agents from the Asahi Guard E-Series™. In some implementations, the fluorinated agent is Asahi Guard E-Series™ AG-E060. In some implementations, the fluorinated agent is Asahi Guard E-Series™ AG-E100. In some implementations, the fluorinated agent is Asahi Guard E-Series™ AG-E1001. In some implementations, the fluorinated agent is Asahi Guard E-Series™ AG-E1002.

The perfluorosilane fluorinated additives described herein can be represented by formula (I):

wherein
$W_1$ is H, Cl, OH, O—$C_{1-3}$ alkyl, $C_{1-3}$ alkyl, or phenyl;
$W_2$ is H, Cl, OH, O—$C_{1-3}$ alkyl, $C_{1-3}$ alkyl, or phenyl;
$W_3$ is H, Cl, OH, O—$C_{1-3}$ alkyl, $C_{1-3}$ alkyl, or phenyl;
each X is independently $C_{1-6}$ alkyl, $C_{1-6}$ perfluoroalkyl, phenyl, or perfluorophenyl;
each Y is independently O, $NR^a$, $C_{1-6}$ alkyl, phenyl, O—$C_{1-6}$ alkyl, $C_{1-6}$ perfluoroalkyl, perfluorophenyl, (C=O)—O—($C_{1-6}$)alkyl, or (C=O)—$NR^a$, wherein $R^a$ is H or $C_{1-3}$ alkyl;
Z is $C_{1-12}$ perfluoroalkyl or O—$C_{1-12}$ perfluoroalkyl;
the subscript a is 0-500;
the subscript b is 0 or 1; and
the subscript c is 0 or 1.

A $C_{1-3}$ or $C_{1-6}$ alkyl group refers to a straight chain or branched, saturated hydrocarbon having the indicated number of carbons (i.e., between 1 to 3 carbon atoms for $C_{1-3}$ alkyl, and between 1 to 6 carbon atoms for $C_{1-6}$ alkyl, respectively) that is not further substituted unless indicated otherwise explicitly. $C_{1-3}$ alkyl includes methyl, ethyl, n-propyl and isopropyl groups. $C_{1-6}$ alkyl further includes, for example, n-butyl, sec-butyl, isobutyl, tert-butyl, isopentyl, n-pentyl (amyl), neopentyl, n-hexyl, among others. As used herein, a "perfluoroalkyl" group refers to a straight chain or branched hydrocarbon wherein all of the hydrogen atoms in the chain are replaced by fluorine atoms. As in the case for alkyl groups, the subscript indicates the number of carbon atoms in the chain, i.e., a $C_{1-12}$ perfluoroalkyl group has between 1 and 12 carbon atoms within the chain.

In some implementations, $W_1$, $W_2$, and $W_3$ of the perfluorosilane fluorinated additive described herein are each independently O—$C_{1-3}$ alkyl. In some implementations, $W_1$, $W_2$, and $W_3$ are $OCH_3$. In some implementations, $W_1$, $W_2$, and $W_3$ are $OCH_2CH_3$. In some implementations, two of $W_1$, $W_2$, and $W_3$ are each independently O—$C_{1-3}$ alkyl and one of $W_1$, $W_2$, and $W_3$ is Cl. In some implementations, two of $W_1$, $W_2$, and $W_3$ are Cl and one of $W_1$, $W_2$, and $W_3$ is O—$C_{1-3}$ alkyl. In some implementations, two of $W_1$, $W_2$, and $W_3$ are $OCH_3$ and one of $W_1$, $W_2$, and $W_3$ is Cl. In some implementations, two of $W_1$, $W_2$, and $W_3$ are $OCH_2CH_3$ and one of $W_1$, $W_2$, and $W_3$ is Cl. In some implementations, $W_1$, $W_2$, and $W_3$ are Cl. In some implementations, one of $W_1$, $W_2$, and $W_3$ is OH. In some implementations, two of $W_1$, $W_2$, and $W_3$ are OH. In some implementations, $W_1$, $W_2$, and $W_3$ are OH.

In some implementations, X and Y of the perfluorosilane fluorinated additive described herein are both $C_{1-6}$ alkyl. In some implementations, X is $C_{1-6}$ alkyl. In some implementations, X is $CH_2CH_3$. In some implementations, X is $CH_2CH_2CH_2CH_3$. In some implementations, X is $CH_2CH_2CH_2CH_2CH_2CH_3$. In some implementations, X is phenyl. In some implementations, Y is $C_{1-6}$ alkyl. In some implementations, Y is O or NH. In some implementations, Y is (C=O)—NH. In some implementations, Z of the perfluorosilane described herein is a $C_{1-12}$ perfluoroalkyl. In some implementations, Z is a $C_{6-10}$ perfluoroalkyl. In some implementations, Z is $C_8$ perfluoroalkyl. In some implementations, Z is $C_{10}$ perfluoroalkyl. In some implementations, subscript b is 0, indicating the $(X)_b$ group is absent. In some implementations, subscript c is 0, indicating the $(Y)_c$ end group is absent. In some implementations, the subscript a is 1, and subscripts b and c are both 0. In some implementations, the subscript a is >1, indicating an oligomeric or polymeric Z group. In some implementations, the perfluorosilane fluorinated additive used to prepare the compositions of the present disclosure is 1H,1H,2H,2H-perfluorodecyltriethoxysilane (CAS Number 101947-16-4). In some implementations, the perfluorosilane fluorinated additive is (tridecafluoro-1,1,2,2-tetrahydrooctyl)triethoxysilane (CAS Number 51851-37-7). In some implementations, the perfluorosilane fluorinated additive is (heptadecafluoro-1,1,2,2-tetrahydrodecyl)dimethylchlorosilane (CAS Number 74612-30-9). In some implementations, the perfluorosilane fluorinated additive is (heptadecafluoro-1,1,2,2-tetrahydrodecyl)trichlorosilane (CAS Number 78560-44-8). In some implementations, the perfluorosilane fluorinated additive is perfluoro(polypropyleneoxy)]methoxypropyltrimethoxysilane (CAS Number 870998-78-0). In some implementations, the perfluorosilane fluorinated additive is (4-perfluorooctylphenyl)triethoxysilane (Gelast Product Code SIP6720.71). In some implementations, the perfluorosilane fluorinated additive is heneicosafluorododecyltrichlorosilane (CAS Number 102488-49-3).

The optional fluorochemical, when present in the compositions described herein, can be the same or different from the fluorinated additives used to modify the nanotubes. In some implementations, the optional fluorochemical is the same as the fluorinated additive used to modify the nanotubes. In some implementations, the optional fluorochemical is a perfluorosilane of formula (I). In some implementations, the optional fluorochemical is a perflurosilane selected from 1H,1H,2H,2H-perfluorodecyltriethoxysilane, (tridecafluoro-1,1,2,2-tetrahydrooctyl)triethoxysilane, (heptadecafluoro-1,1,2,2-tetrahydrodecyl)dimethylchlorosilane, (heptadecafluoro-1,1,2,2-tetrahydrodecyl)trichlorosilane, perfluoro(polypropyleneoxy)]methoxypropyltrimethoxysilane, (4-perfluorooctylphenyl)triethoxysilane, and heneicosafluorododecyltrichlorosilane. In some implementations, the optional fluorochemical is 1H,1H,2H,2H-perfluorodecyltriethoxysilane (PFDTES, CAS #101947-16-4). In some implementations, the optional fluorochemical is a non-silicon containing fluorinated compound. Non-silicon containing fluorochemical can be a cationic fluorochemical, a neutral fluorochemical, a monomeric, oligomeric, or polymeric fluorochemical. In some implementations, the non-silicon containing fluorochemical is a fluorinated methacrylate. In some implementations, the non-silicon containing fluorochemical is a fluorinated polyurethrane. In some implementations, the optional fluorochemical is one of the fluorochemicals selected from the Asahi Guard E-Series™. In some implementations, the fluorochemical is Asahi Guard E-Series™ AG-E060. In some implementations, the fluorochemical is Asahi Guard E-Series™ AG-E100. In some implementations, the fluorochemical is Asahi Guard E-Series™ AG-E1001. In some implementations, the fluorochemical is Asahi Guard E-Series™ AG-E1002.

Figure 1:
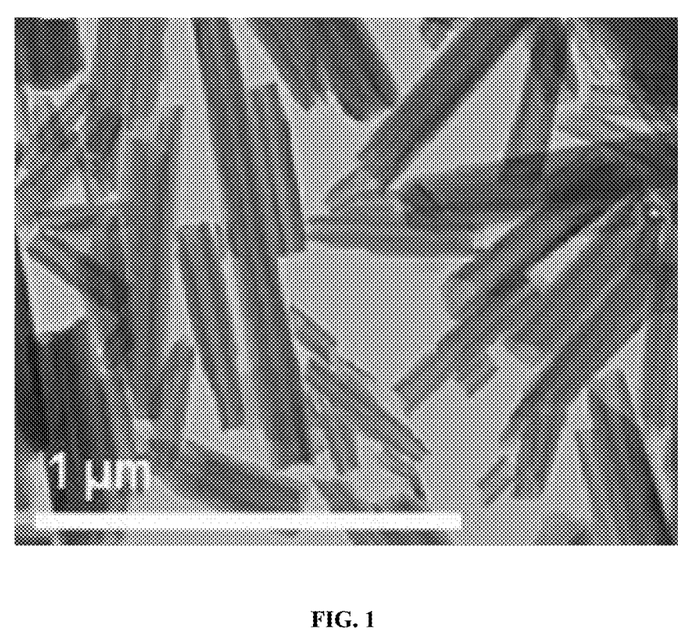
FIG. 1 shows an SEM microscopy view of halloysite nanotubes.

The compositions described herein can include nanoscale materials, which are materials where at least one relevant length scale is within the range of nanometers, and are made of aluminum, carbon, magnesium, silica, silver, oxides, or mixtures and derivatives thereof. For example, these nanoscale materials can include, but are not limited to, palygorskite, halloysites, cellulose nanocrystals (CNC), silica nanoparticles, carbon nanotubes, or silver nanorods, or mixtures thereof. In some implementations, the compositions include halloysites, which are aluminosilicate clay mineral with the empirical formula $Al_2Si_2O_5(OH)_4$. In some implementations, the compositions include cellulose nanocrystals (CNC). In some implementations, the compositions include silica nanoparticles. In some implementations, the compositions include halloysites and silica nanoparticles. Modification of these nanoscale materials with one or more fluorinated additives provides the fluorinated nanotubes in the compositions described herein. The fluorinated nanotubes are about 0.1 µm to about 10 µm, about 0.2 µm to about 5 µm, about 0.3 µm to about 7 µm, or about 0.5 µm to about 2 µm in length, and about 10 nm to about 1000 nm, about 100 nm to about 800 nm, or about 300 nm to about 600 nm in diameter. In some implementations, the fluorinated nanotubes in the compositions are about 0.1 µm to about 10 µm in length and about 500 nm in diameter. For example, SEM microscopy image of halloysite nanotubes is shown in FIG. 1. In some implementations, the fluorinated nanotubes have an average weight ratio of the nanotubes to the fluorinated additive of about 95:5 to about 60:40, about 90:10, about 80:20, about 70:30, about 60:40, about 50:50, or about 40:60. In some implementations, the fluorinated nanotubes have an average weight ratio of the nanotubes to the fluorinated additive of about 83:17. In some implementations, the fluorinated nanotubes have an average weight ratio of the nanotubes to the fluorinated additive of about 66:34.

The compositions described herein that include fluorinated nanotubes further include a binder, for example, a silicone binder, a styrene-isobutylene block (SIBS) copolymer, an elastomeric polymer, a thermoplastic elastomer, a polyamide elastomer, hot melt glue, an epoxy, or an acrylic, or mixtures thereof. In some implementations, the binder includes silicone binders, styrene-isobutylene block (SIBS) copolymers, polyurethane elastomer epoxides, or acrylics, or mixtures thereof. In some implementations, the binder is a silicone binder. In some implementations, the binder includes cyclomethicone with a catalyst and crosslinker (such as Karstedt catalyst). In some implementations, the binder is JHP-0308-2 from Dongguan Jianhe Chemical Technology Co., Ltd. In some implementations, the binder is a SIBS copolymer. In some implementations, the binder is a SIBS copolymer selected from SIBSTAR™ 103T, SIBSTAR™ 102T, and SIBSTAR™ 73T from Kaneka Corporation. In some implementations, the binder is a copolyester thermoplastic elastomer (COPE). In some implementations, the binder is a polyamide elastomer. In some implementations, the binder is a thermoplastic elastomer. In some implementations, the binder is a polyurethane. In some embodiments, the binder is a crosslinked polyester-based polyurethane as described in U.S. Pat. No. 10,623,861, the disclosure of which is incorporated herein by reference in its entirety.

In some implementations, the compositions include:
a plurality of halloysite nanotubes comprising a perfluorosilane additive; and
a silicone binder; wherein:
the fluorinated halloysite nanotubes have an average diameter of about 30 nm to about 70 nm;
the fluorinated halloysite nanotubes have an average length of about 0.2 µm to about 5 µm;
the fluorinated halloysite nanotubes is present in the composition at about 38% by weight; and
the binder is present in the composition at about 62% by weight.

In some implementations, the compositions include:
a plurality of halloysite nanotubes comprising a perfluorosilane additive;
a perfluorosilane fluorochemical, and
a silicone binder, wherein:
the fluorinated halloysite nanotubes have an average diameter of about 30 nm to about 70 nm;
the fluorinated halloysite nanotubes have an average length of about 0.2 µm to about 5 µm;
the fluorinated halloysite nanotubes is present in the composition at about 31% by weight;
the perfluorosilane fluorochemical is present in the composition at about 18% by weight; and
the binder is present in the composition at about 51% by weight.

Modification of nanotubes with one or more fluorinated additives starts with activating the nanotubes (e.g., the surface of the nanotubes) via oxidation, for example, chemical oxidation, photo-oxidation, or gas-phase oxidation. In some implementations, surface activation of nanotubes involves reacting a plurality of nanotubes with the Piranha etch solution (mixture of sulfuric acid, hydrogen peroxide and water), hot nitric acid, fuming sulfuric acid, concentrated hydrochloric acid, or mixtures thereof. In some implementations, surface activation of nanotubes involves photo-oxidation using ultraviolet (UV) light. In some implementations, surface activation of nanotubes involves reacting a plurality of nanotubes with the Piranha etch solution. In some implementations, surface activation of nanotubes involves gas-phase oxidation using plasma gas.

An example method of preparing a composition of the present disclosure is described below, including the following steps:
(a) activating the surface of a plurality of nanotubes;
(b) sonicating a mixture of activated nanotubes dispersed in a solvent;
(c) heating the sonicated mixture with one or more fluorinated additives; and
(d) removing solvent from the heated mixture.

In some implementations, surface activation of nanotubes (step a) involves heating the nanotubes in a mixture of 7:3 (v/v) concentrated sulfuric acid and 30% (v/v) aqueous hydrogen peroxide solution for about 1 hour at about 90° C. After oxidation, the activated nanotubes are rinsed with water to remove any residual acid or oxidant, and dried in a vacuum oven for about 24 hours.

The dried, surface-activated nanotubes are then treated with a fluorinated additive. First, the surface-activated nanotubes are dispersed in a suitable solvent by sonication for about 30 minutes (step b). Suitable solvents for dispersing the surface-activated nanotubes and carrying out the fluorination in step (c) include xylenes, toluene, ethylbenzene, aromatic naphthas, or mixtures thereof. In some implementations, the solvent used to disperse the surface-activated nanotubes is toluene. In some implementations, the solvent used to disperse the surface-activated nanotubes is aromatic naphthas. A fluorinated additive is added to the nanotubes-solvent mixture and the resulting mixture is heated at reflux for about 24 to 30 hours in step (c). In some implementations, the fluorination reaction mixture is heated at a temperature of about 110° C. to about 210° C. for about 24 hours. In some implementations, the fluorination reaction mixture is heated at a temperature of about 110° C. for 24 hours. In some implementations, the fluorination reaction mixture is heated at a temperature of about 110° C. for 28 hours. In some implementations, the fluorination reaction mixture is heated at a temperature of about 110° C. for 30 hours. The solvent is removed by decanting in step (d), and unbound fluorinated additive can be removed by rinsing the fluorinated nanotubes with fresh aliquots of the same solvent used in the fluorination reaction upon completion of the fluorination reaction. Fourier-transformed infrared (FT-IR) spectroscopy is used to confirm the modification of nanotubes by fluorinated additives.

In some implementations, the compositions described herein include grafting silica nanoparticles onto the surface of the nanotubes to increase the roughness of the surface prior to surface activation. The grafting of the silica nanoparticles is carried out e.g., by treating halloysite nanotubes with a about 28-30% (v/v) aqueous ammonium solution in ethanol (about 4:1 v/v) and 1 mL of tetraethyl orthosilicate (TEOS) for about 30 min at room temperature.

In some implementations, the compositions include cellulose nanocrystals (CNC). Cellulose nanocrystals are derived from cellulose, which can be obtained through acid hydrolysis of cellulose, for example, by exposure to sulfuric acid under controlled temperature and time period. In some implementations, the cellulose nanocrystals have an average length of about 1 nm to about 50 nm, and an average diameter of about 100 nm to about 3000 nm. In some implementations, the compositions that include cellulose nanocrystals further include one or more fluorinated additives. In some implementations, the fluorinated additive used in the fluorination of cellulose nanocrystals is AG-E060 (Asahi Chemical). In some implementations, about 0.5 wt % to about 1 wt % of the fluorinated additive is used in the fluorination reaction of CNC. In some implementations, about 1 wt % to about 1.5 wt % of the fluorinated additive is used in the fluorination reaction. In some implementations, about 1.5 wt % to about 2 wt % of the fluorinated additive is used in the fluorination reaction. In some implementations, about 2 wt % to about 2.5 wt % of the fluorinated additive is used in the fluorination reaction. In some implementations, about 2.5 wt % to about 3 wt % of the fluorinated additive is used in the fluorination reaction. In some implementations, the compositions described herein include about 45%, about 51%, about 58%, about 62%, or about 65% by weight of a binder. In some implementations, the compositions described herein include about 25%, about 31%, about 35%, about 38% or about 40% by weight of a plurality of fluorinated cellulose nanocrystals and a binder. In some implementations, the compositions include about 38% by weight of a plurality of fluorinated cellulose nanocrystals and about 62% by weight of a binder. Suitable binders in the compositions that include fluorinated cellulose nanocrystals include, for example, a silicone binder, a styrene-isobutylene block (SIBS) copolymer, an elastomeric polymer, a thermoplastic elastomer, a polyamide elastomer, hot melt glue, an epoxy, or an acrylic, or mixtures thereof. In some implementations, the binder includes silicone binders, styrene-isobutylene block (SIBS) copolymers, polyurethane elastomer, epoxides, or acrylics, or mixtures thereof.

In some implementations, the compositions that include fluorinated cellulose nanocrystals include a silicone binder. In some implementations, the compositions that include fluorinated cellulose nanocrystals, a binder, and an optional fluorochemical. The optional fluorochemical, when present in the compositions comprising fluorinated cellulose nanocrystals and a binder, can be the same or different from the fluorinated additives used to modify the cellulose nanocrystals. In some implementations, the optional fluorochemical is the same as the fluorinated additive used to modify the cellulose nanocrys. In some implementations, the optional fluorochemical is a perfluorosilane of formula (I). In some implementations, the optional fluorochemical is a perfluorosilane selected from 1H,1H,2H,2H-perfluorodecyltriethoxysilane, (tridecafluoro-1,1,2,2-tetrahydrooctyl)triethoxysilane, (heptadecafluoro-1,1,2,2-tetrahydrodecyl) dimethylchlorosilane, (heptadecafluoro-1,1,2,2-tetrahydrodecyl)trichlorosilane, perfluoro(polypropyleneoxy)]methoxypropyltrimethoxysilane, (4-perfluorooctylphenyl)triethoxysilane, and heneicosafluorododecyltrichlorosilane. In some implementations, the optional fluorochemical is 1H,1H,2H,2H-perfluorodecyltriethoxysilane (PFDTES, CAS #101947-16-4). In some implementations, the optional fluorochemical is a non-silicon containing fluorinated compound. Non-silicon containing fluorochemical can be a cationic fluorochemical, a neutral fluorochemical, a monomeric, oligomeric, or polymeric fluorochemical. In some implementations, the non-silicon containing fluorochemical is a fluorinated methacrylate. In some implementations, the non-silicon containing fluorochemical is a fluorinated polyurethrane. In some implementations, the optional fluorochemical is one of the fluorochemicals selected from the Asahi Guard E-Series™. In some implementations, the fluorochemical is Asahi Guard E-Series™ AG-E060. In some implementations, the fluorochemical is Asahi Guard E-Series™ AG-E100. In some implementations, the fluorochemical is Asahi Guard E-Series™ AG-E1001. In some implementations, the fluorochemical is Asahi Guard E-Series™ AG-E1002.

An example method for preparing fluorinated cellulose nanocrystals include the following steps:
(a) preparing a first mixture comprising a plurality of cellulose nanocrystals and water;
(b) adjusting the pH of the first mixture to about pH 5.5 to about pH 6 (e.g. pH 5.7) to provide a second mixture;
(c) adding one or more fluorinated additives to the second mixture to provide a third mixture; and
(d) removing residual fluorinated additives from the third mixture.

Unbound or excess fluorinated additives can be removed by rinsing the fluorinated cellulose nanocrystals with water upon completion of the fluorination reaction.

The compositions described herein are suitable for use as a coating that can be applied onto a variety of materials to create an omniphobic material. Materials that can be used with the omniphobic compositions described herein include, but are not limited to, silicone rubber, polyurethane, fluorocarbon-based fluoroelastomer (FKM rubber), butyl rubber, ethylene propylene diene monomer (EPDM) rubber, thermoplastics, cellulose, or metal. In some implementations, the compositions of the present disclosure are applied onto the surface of a silicone rubber or thermoplastic. In some implementations, the compositions of the present disclosure are applied onto the surface of a silicone rubber. In some implementations, the compositions are applied onto the surface of DragonSkin™ from Smooth-On, Inc. In some implementations, the compositions are applied onto the surface of Elastosil® from Wacker Chemie AG. In some implementations, the compositions are applied onto the surface of KE2090-10A from Shin-Etsu Silicones of America, Inc. In some implementations, the compositions of the present disclosure are applied onto the surface of a thermoplastic elastomer (TPE). In some implementations, the compositions are applied onto the surface of a polyurethane TPE. In some implementations, the compositions are applied onto the surface of Vytaflex™ from Smooth-On, Inc. In some implementations, the compositions are applied onto the surface of Estane® from Lubrizol. In some implementations, the compositions of the present disclosure are applied onto the surface of a poly(styrene-block-isobutylene-block-styrene) (SIBS) TPE. In some implementations, the compositions are applied onto the surface of SIBSTAR™ 103T from Kaneka Corporation. In some implementations, the compositions are applied onto the surface of SIBSTAR™ 73T from Kaneka Corporation.

The compositions described herein can be applied onto a material with a smooth (non-textured) surface, or a material with a textured surface. A textured surface can be generated by means of techniques such as photolithography, electron beam lithography, laser-patterning, or using a textured mold, among others. In some implementations, a material with raised surface structures with different topology is created using a textured mold. The density of the features is about 20-30 hills or pillars per $mm^2$ area, about 30-40 hills or pillars per $mm^2$ area, about 40-50 hills or pillars per $mm^2$ area, about 50-60 hills or pillars per $mm^2$ area, or about 60-70 hills or pillars per $mm^2$ area. In some implementations, the height of the hill feature is about 5 µm, about 10 µm, about 15 µm, about 20 µm, or about 25 µm. Each feature (hill/pillar) has nano-sized indentations. In some implementations, the surface of a material is patterned with about 100 pillars/$mm^2$ area, about 150 pillars/$mm^2$ area, about 200 pillars/$mm^2$ area, or about 250 pillars/$mm^2$ area in a cross-hatched pattern. The primary feature is about 10 µm tall by 10 µm wide, about 15 µm tall by 15 µm wide, or about 20 µm tall by 20 µm wide, with nano-sized indentations on each feature.

The contact angle of a water droplet placed on an omniphobic material described in the present disclosure is at least about 100 degrees, about 105 degrees, about 110 degrees, about 115 degrees, about 120 degrees, about 125 degrees, about 130 degrees, about 135 degrees, about 140 degrees, about 145 degrees, about 150 degrees, about 155 degrees, or about 160 degrees. In some implementations, the contact angle of a water droplet placed on an omniphobic material described in the present disclosure is less than about 180 degrees. In some implementations, the contact angle of a water droplet placed on an omniphobic material of the present disclosure is at least about 110 degrees. In some implementations, the contact angle of a water droplet placed on an omniphobic material of the present disclosure is between about 110 degrees and about 140 degrees. In some implementations, the contact angle of a water droplet placed on an omniphobic material of the present disclosure is at least about 140 degrees. The contact angle of an oil droplet placed on an omniphobic material described in the present disclosure is at least about 80 degrees, about 85 degrees, about 90 degrees, about 95 degrees, about 100 degrees, about 105 degrees, about 110 degrees, about 115 degrees, about 120 degrees, about 125 degrees, about 130 degrees, about 135 degrees, about 140 degrees, about 145 degrees, about 150 degrees, about 155 degrees, or about 160 degrees. In some implementations, the contact angle of an oil droplet placed on an omniphobic material described in the present disclosure is less than about 180 degrees. In some implementations, the contact angle of an oil droplet placed on an omniphobic material of the present disclosure is at least about 90 degrees. In some implementations, the contact angle of an oil droplet placed on an omniphobic material of the present disclosure is between about 90 degrees and about 150 degrees. In some implementations, the contact angle of an oil droplet placed on an omniphobic material of the present disclosure is at least about 140 degrees.

A material with omniphobic surface properties can be prepared using the compositions described herein. An example method of preparing a material with omniphobic surface properties is described below, including the following steps:
(a) preparing a first mixture comprising about 10% to about 30% by weight of a composition described herein and one or more thinners;
(b) sonicating the first mixture to provide a second mixture;
(c) spraying the second mixture onto a material's surface using a hand sprayer to generate a sprayed material; and
(d) curing the sprayed material.

Figure 2:
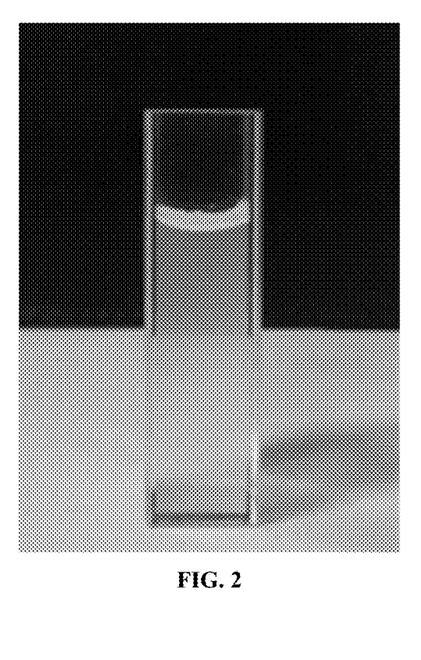
FIG. 2 shows a suspension of fluorinated halloysite nanotubes in a mixture of a silicone binder, naphtha and ethyl acetate thinners.

Suitable thinners for the method used to prepare a material with omniphobic surface properties include acetone, acetonitrile, dichloromethane, naphtha, hexanes, pentane, diethyl ether, acetic esters, tetrahydrofuran, or mixtures thereof. In some implementations, the thinner is naphtha. In some implementations, the thinner is ethyl acetate. In some implementations, the thinner is a mixture of naphtha and ethyl acetate. An example of a composition comprising a plurality of fluorinated halloysite nanotubes, a silicone binder, and naphtha and ethyl acetate thinners is shown in FIG. 2.

In some implementations, the amount of the composition in the first mixture in step (a) is at about 15% by weight. In some implementations, the amount of the composition in the first mixture in step (a) is at about 20% by weight. In some implementations, the amount of the composition in the first mixture in step (a) is at about 25% by weight. In some implementations, the material is a silicone. In some implementations, the material is a polyurethane. In some implementations, the material is a thermoplastic elastomer (TPE). In some implementations, the material is DragonSkin™ 20 from Smooth-On, Inc. In some implementations, a catalyst can be used for curing in step (d). In some implementations, the catalyst is Karstedt catalyst (CAS Number 68478-92-9). In some implementations, the curing step (step (d)) does not include a catalyst. In some implementations, step (d) is carried out at a temperature between about 100° C. and about 180° C. for 10 to 30 minutes, for example, at about 100° C. for 30 minutes; at about 120° C. for 25 minutes, at about 140° C. for 20 minutes, at about 160° C. for 15 minutes, or at about 180° C. for 10 minutes. In some implementations, the curing step is carried out at about 150° C. for about 20 min. The coated material is analyzed by 3D-laser scanning confocal microscope to check surface roughness and coating thickness. Contact angle measurements to confirm the water and oil repellency of the coated materials are performed using a Ramehart goniometer. The reported contact angle measurements are average values measured at three different locations of the coated material.

In some implementations, the coated substrate is further sprayed with a fluorochemical using a hand sprayer. The fluorochemical used to spray the coated substrate can be the same or different from the fluorochemical present in the compositions of step (a). In some implementations, the fluorochemical used to spray the coated substrate is the same as the fluorochemical present in the compositions of step (a). In some implementations, the fluorochemical used to spray the coated substrate is a perfluorosilane of formula (I). In some implementations, the fluorochemical used to spray the coated substrate is a perflurosilane selected from 1H,1H,2H,2H-perfluorodecyltriethoxysilane, (tridecafluoro-1,1,2,2-tetrahydrooctyl)triethoxysilane, (heptadecafluoro-1,1,2,2-tetrahydrodecyl)dimethylchlorosilane, (heptadecafluoro-1,1,2,2-tetrahydrodecyl)trichlorosilane, perfluoro(polypropyleneoxy)]methoxypropyltrimethoxysilane, (4-perfluorooctylphenyl)triethoxysilane, and heneicosafluorododecyltrichlorosilane. In some implementations, the fluorochemical used to spray the coated substrate is 1H,1H,2H,2H-perfluorodecyltriethoxysilane (PFDTES, CAS #101947-16-4). In some implementations, the fluorochemical used to spray the coated substrate is a non-silicon containing fluorinated compound. Non-silicon containing fluorochemical used to spray the coated substrate can be a cationic fluorochemical, a neutral fluorochemical, a monomeric, oligomeric, or polymeric fluorochemical. In some implementations, the non-silicon containing fluorochemical used to spray the coated substrate is a fluorinated methacrylate. In some implementations, the non-silicon containing fluorochemical used to spray the coated substrate is a fluorinated polyurethrane. In some implementations, the fluorochemical used to spray the coated substrate is one of the fluorochemicals selected from the Asahi Guard E-Series™. In some implementations, the fluorochemical used to spray the coated substrate is Asahi Guard E-Series™ AG-E060. In some implementations, the fluorochemical used to spray the coated substrate is Asahi Guard E-Series™ AG-E100. In some implementations, the fluorochemical used to spray the coated substrate is Asahi Guard E-Series™ AG-E1001. In some implementations, the fluorochemical used to spray the coated substrate is Asahi Guard E-Series™ AG-E1002.

Materials coated with a composition of the present disclosure is tested for the robustness of the coating by measuring the water and oil contact angles after incubating the coated materials in ambient conditions for about 30 days or in an oven set to about 130° C. for >4 days. Coated materials that have been incubated in ambient conditions for about 30 days showed no change in the water and oil contact angles. Coated materials that have been incubated in an oven at about 130° C. showed no statistically significant changes in the water (Table 1) and oil contact angles.

The robustness of the coating was also tested by applying Scotch™ tape onto the coating and peeling off the tape, where no obvious delamination of the coating could be detected by visual inspection. A slight decrease in the water repellency was observed after the tape test, indicating robustness of the coating. Furthermore, the integrity of the coating remained unchanged after being subjected to 10,000 cycles of a 0.1N tension/14.0% strain stress using a TA RSAG2 instrument. No visible cracking or delamination of the stressed sample was observed under the highest magnification (3×) of an Olympus SZ61 optical microscope. The water contact angle of the stressed sample remained unchanged (>140°).

TABLE 1

Water Contact Angle Measurements Before and After Stress Test

| | Water Contact Angle (θ) - Pre Stress | Water Contact Angle (θ) - Post Stress |
|---|---|---|
| Uncoated silicone substrate | 105° | Not Tested |
| 30 days at ambient conditions | 144° to 147° | 140° to 148° |
| 4 days at 130° C. | 140° to 145° | 139° to 144° |
| Delamination using Scotch Tape | 140° to 145° | 120° to 130° |

Contact angles are measured at 3 different locations of the sample.

Without being limited to certain combinations, an apparatus can have one or more of its components made from one or more compositions provided herein. The apparatus can be an acoustical device, a microphone, a wearable device, a hearing aid, a waveguide, an eartip, or an earpiece. For example, the waveguide or the wax guard of a receiver in canal (RIC) hearing aid earpiece can be made from one or more compositions provided in this disclosure.

As used herein, and unless otherwise specified, the term "about," when used in connection with a numeric value or range of values is to indicate that the value or range of values may deviate to an extent deemed reasonable to one of ordinary skill in the art. In general, the term "about" is used herein to modify a numerical value above and below the stated value by a variance of 10% unless otherwise specified. For temperature values in degree Celsius (° C.), the term "about" is used to indicate the stated value ±3° C. It is well known that instrument variation and other factors can affect the numerical values. The term "about" is to accommodate these variations. Each reference, including all patent, patent applications, and publications, cited in the present application is incorporated herein by reference in its entirety.

What is claimed is:

1. A composition comprising a plurality of fluorinated nanotubes and a binder, wherein:
   the fluorinated nanotubes comprise one or more fluorinated additives;
   the fluorinated nanotubes is present in the composition from about 5% to about 90% by weight; and
   the binder is present in the composition from about 95% to about 5% by weight.

2. The composition of claim 1, wherein the one or more fluorinated additives comprise a perfluorosilane represented by formula (I):

(I)

wherein
$W_1$ is H, Cl, OH, O—$C_{1-3}$ alkyl, $C_{1-3}$ alkyl, or phenyl;
$W_2$ is H, Cl, OH, O—$C_{1-3}$ alkyl, $C_{1-3}$ alkyl, or phenyl;
$W_3$ is H, Cl, OH, O—$C_{1-3}$ alkyl, $C_{1-3}$ alkyl, or phenyl;
each X is independently $C_{1-6}$ alkyl, $C_{1-6}$ perfluoroalkyl, phenyl, or perfluorophenyl;
each Y is independently O, $NR^a$, $C_{1-6}$ alkyl, phenyl, O—$C_{1-6}$ alkyl, $C_{1-6}$ perfluoroalkyl, perfluorophenyl, (C=O)—O—($C_{1-6}$)alkyl, or (C=O)—$NR^a$, wherein $R^a$ is H or $C_{1-3}$ alkyl;
Z is $C_{1-12}$ perfluoroalkyl or O—$C_{1-12}$ perfluoroalkyl;
the subscript a is 0-500;
the subscript b is 0 or 1; and
the subscript c is 0 or 1.

3. The composition of claim 2, wherein $W_1$, $W_2$, and $W_3$ are each independently O—$C_{1-3}$ alkyl.

4. The composition of claim 2, wherein two of $W_1$, $W_2$, and $W_3$ are each independently O—$C_{1-3}$ alkyl and one of $W_1$, $W_2$, and $W_3$ is Cl.

5. The composition of claim 2, wherein X and Y are both $C_{1-6}$ alkyl.

6. The composition of claim 2, wherein Z is $C_8$ perfluoroalkyl.

7. The composition of claim 2, wherein subscript a is 1, and subscripts b and c are both 0.

8. The composition of claim 1, wherein the one or more fluorinated additives comprise a non-silicon containing fluorinated agent.

9. The composition of claim 1, wherein the plurality of fluorinated nanotubes comprises palygorskite, halloysites, cellulose nanocrystals (CNC), silica nanoparticles, carbon nanotubes, or silver nanorods, or mixtures thereof.

10. The composition of claim 1, wherein the binder comprises silicone binders, styrene-isobutylene block (SIBS) copolymers, polyurethane elastomer, epoxides, or acrylics, or mixtures thereof.

11. The composition of claim 1, wherein the composition further comprises a fluorochemical.

12. The composition of claim 1, wherein the composition comprises about 30% to about 55% of fluorinated nanotubes, about 15% to about 40% of a fluorochemical, and about 30% to about 55% binder by weight.

13. The composition of claim 1, wherein the composition is applied onto a material's surface as a coating.

14. A method of preparing a material, comprising:
   (a) preparing a first mixture comprising about 10% to about 30% by weight of a composition of claim 1 and one or more thinners;
   (b) sonicating the first mixture to provide a second mixture;
   (c) spraying the second mixture onto a substrate's surface using a hand sprayer to generate a sprayed substrate; and
   (d) curing the sprayed substrate.

15. The method of claim 14, comprising spraying a fluorochemical on top of the sprayed substrate using a hand sprayer.

16. The method of claim 14, wherein the fluorochemical comprises a perfluorosilane as represented by formula (I).

17. The method of claim 14, wherein the fluorochemical comprises a non-silicon containing fluorinated compound.

* * * * *